(12) United States Patent  (10) Patent No.: US 7,987,744 B2
Hanning et al.  (45) Date of Patent: Aug. 2, 2011

(54) HAND GRIP OPERATING MEANS FOR AN INSULATION-STRIPPING TOOL

(75) Inventors: Guenther Hanning, Detmold (DE); Christian Heggemann, Detmold (DE); Detlev Hetland, Detmold (DE); Thomas Koester, Schlangen (DE); Andreas Wedler, Detmold (DE); Siegfried Storm, Schlangen (DE)

(73) Assignee: Weidmueller Interface GmbH & Co. KG, Detmold (DE)

( * ) Notice: Subject to any disclaimer, the term of this patent is extended or adjusted under 35 U.S.C. 154(b) by 134 days.

(21) Appl. No.: 12/321,916

(22) Filed: Jan. 27, 2009

(65) Prior Publication Data

US 2009/0199682 A1 Aug. 13, 2009

(30) Foreign Application Priority Data

Jan. 31, 2008 (DE) .................... 20 2008 001 390 U
Jun. 12, 2008 (DE) .................... 20 2008 008 012 U

(51) Int. Cl.
*H02G 1/12* (2006.01)
*B25B 7/00* (2006.01)

(52) U.S. Cl. ........................ 81/9.43; 81/427.5

(58) Field of Classification Search ............ 81/9.43, 81/300, 316, 341–344, 347, 348, 352, 381, 81/382, 385, 392, 393, 394, 415, 427.5
See application file for complete search history.

(56) References Cited

U.S. PATENT DOCUMENTS 2,535,215 A * 12/1950 Klenk .............................. 81/347
5,507,207 A *  4/1996 Benoit et al. .................. 81/9.43
5,572,911 A    11/1996 Schmode
5,722,171 A *  3/1998 Schmidt ........................... 30/255
6,895,836 B2   5/2005 Hetland
6,910,401 B2   6/2005 Tapper
7,140,278 B2 * 11/2006 Neumann et al. ............ 81/427.5
7,735,399 B2 *  6/2010 Robinson et al. ............ 81/177.8
2006/0090613 A1 5/2006 Hsieh

FOREIGN PATENT DOCUMENTS

| DE | 86 27 272.1 | 8/1987 |
| DE | 43 13 996 C1 | 7/1994 |
| DE | 4313996 C1 | 7/1994 |
| DE | 44 14 967 A1 | 11/1995 |
| DE | 199 23 998 A1 | 12/2000 |
| DE | 200 20 988 U1 | 5/2001 |
| DE | 101 13 012 C1 | 8/2002 |
| DE | 203 14 036 U1 | 12/2003 |

(Continued)

*Primary Examiner* — David B Thomas

(74) *Attorney, Agent, or Firm* — Lawrence E. Laubscher, Sr.; Lawrence E. Laubscher, Jr.

(57) ABSTRACT

A pliers-type gripping tool includes a pair of gripping jaws, a pair of pivotally connected hand grip levers for operating the gripping jaws between an open separated condition and a closed gripping condition, and an adjusting device for varying one of the physical operating properties of the tool. In one embodiment, the hand grip levers are sectional, and the adjusting device includes an angle setting arrangement for determining the angular relationship of the sections, thereby to permit use of the tool to engage an object at a relatively inaccessible location. In a second embodiment, at least one of the levers includes a metal lever body member partially enclosed by a synthetic plastic shell member. An adjusting device controls the lateral relative positions of the lever body and shell members to adjust the effective thickness of the hand grips to correspond with the size of the hand of the user.

13 Claims, 5 Drawing Sheets

FOREIGN PATENT DOCUMENTS

| | | |
|---|---|---|
| DE | 203 14 037 U1 | 12/2003 |
| DE | 20314036 U1 | 12/2003 |
| DE | 20 2004 013 591 U1 | 1/2005 |
| DE | 20 2004 013 977 U1 | 2/2005 |
| EP | 1 147 859 A3 | 6/2003 |
| EP | 1557920 B1 | 11/2006 |

* cited by examiner

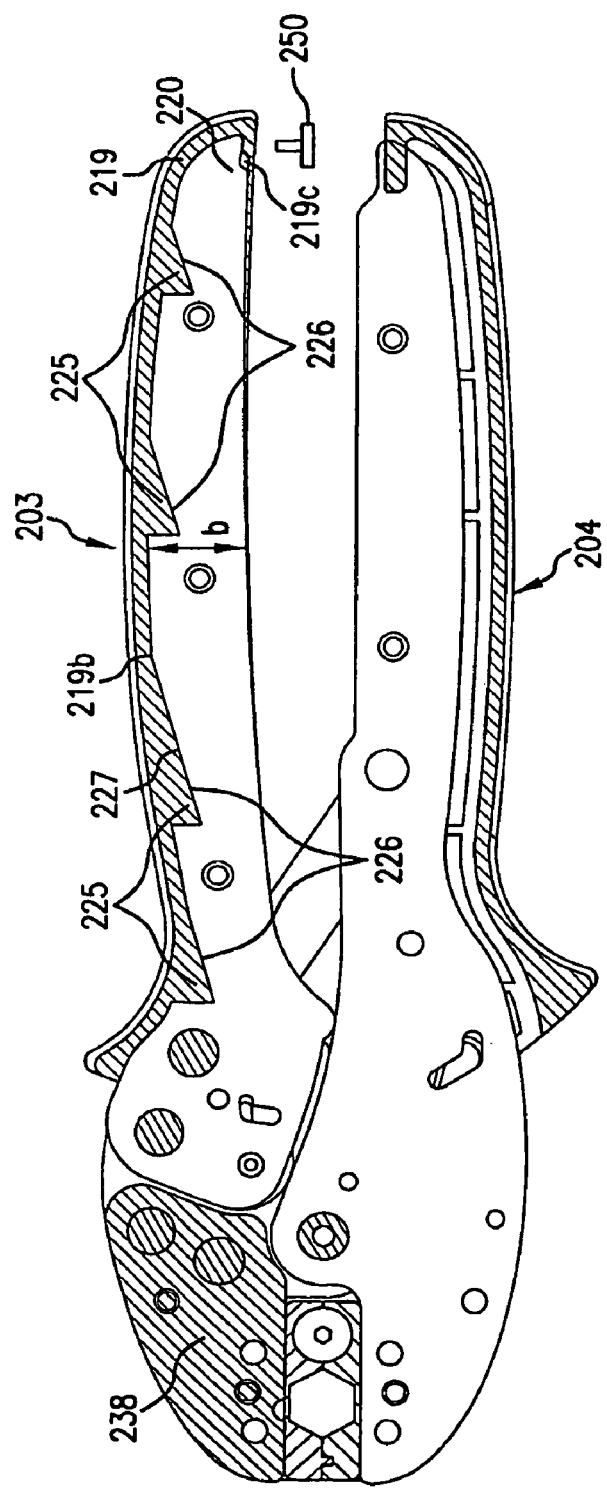
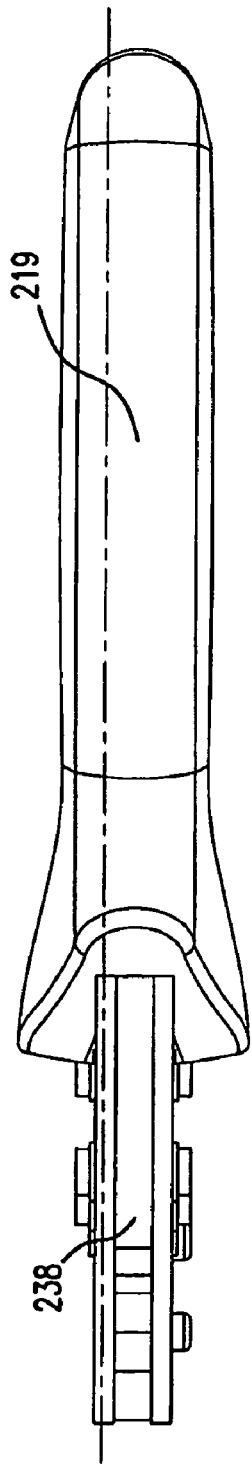
FIG.7
FIG.8

HAND GRIP OPERATING MEANS FOR AN INSULATION-STRIPPING TOOL

REFERENCE TO RELATED APPLICATIONS

This application is related to the Storm et al U.S. patent application Ser. Nos. 12/290,479 filed Oct. 31, 2008, 12/290,557 filed Oct. 31, 2008, and 12/290,558 filed Oct. 31, 2008.

BACKGROUND OF THE INVENTION

1. Field of the Invention

A pliers-type gripping tool includes a pair of gripping jaws, a pair of pivotally connected hand grip levers for operating the gripping jaws between an open separated condition and a closed gripping condition, and an adjusting device for varying one of the physical operating properties of the tool. In one embodiment, the hand grip levers are sectional, and the adjusting device includes an angle setting arrangement for determining the angular relationship of the sections, thereby to permit use of the tool to engage an object at a relatively inaccessible location. In a second embodiment, at least one of the levers includes a metal lever body member partially enclosed by a synthetic plastic shell member. An adjusting device controls the lateral relative positions of the lever body and shell members to adjust the effective thickness of the hand grips to correspond with the size of the hand of the user.

2. Description of Related Art

Pliers-type gripping tools for stripping insulation from insulated conductors are known in the patented prior art, as evidenced by the U.S. patents to Schmode et al U.S. Pat. No. 5,572,911, Hetland et al U.S. Pat. No. 6,895,836, and Tapper No. U.S. Pat. 6,910,401.

Pliers-type gripping tools normally comprise a tool body, a pair of gripping jaws, and two hand grips, one of which is rigidly attached to the pliers or is partially designed integrally with the pliers body, and the other of which is pivotably connected with the body of the pliers, so that in operation, the pivotable hand grip is forced in the direction of the hand grip that is rigidly attached to the pliers body. The hand grips are normally in a fixed angular position relative to the body of the pliers. It is a disadvantage here that such pliers cannot be handled optimally in areas of work where access is difficult, in particular when the object to be processed is situated behind another object and the user of the pliers can approach the object to be machined only at an angle which is a disadvantage for the pliers. It is also a disadvantage that the grip width of pliers is adapted to the grip width of an average hand. For example, if a user has a very large hand in comparison with the hand of the average user, then such pliers will not fit well in the user's hand, and his hand muscles will become fatigued more rapidly.

The object of the present invention is therefore to develop a hand grip for pliers as well as the pliers themselves, so that the aforementioned disadvantages can be eliminated and the pliers can be manufactured inexpensively.

SUMMARY OF THE INVENTION

Accordingly, a primary object of the present invention is to provide adjustment means for adjusting a pliers-type gripping tool to meet the needs of the user.

A more specific object of the invention is to provide angular adjustment means for adjusting the angular relationship of the gripping sections of a pair of sectional hand grip levers relative to the tool jaws, thereby to permit the gripping of an object arranged at a relatively inaccessible location. Angle setting means serve to fixedly adjust the angular relationship between the hand grip lever sections. Owing to the use of the articulated joint used in the hand grip for pliers, it is possible to easily lock the hand grip for the pliers in the desired working position. Therefore, even objects that are difficult to reach can be processed easily by using these pliers having the angled hand grips.

According to another object of the invention, thickness adjusting means are provided for adjusting the effective thickness of the hand grip levers to cause the grip dimensions to correspond with the size of the user's hand. In one embodiment, screw means are provided for adjusting the distance between the metal hand lever body and a synthetic plastic shell that partially encloses the same. In another embodiment, cam means with cooperating inclined ramp surfaces serve to adjust the distance between the shell and lever body components, thereby to adjust the effective thickness of the handgrip. The adjustable shell member of the hand grip placed on the grip for the pliers can be installed easily and quickly. The adjustment to a grip width that is convenient for the user can be performed easily and quickly. Owing to the design of the adjusting mechanism for adjusting the grip width as a protrusion displaceable in a recess between the grip shell and a hand lever, especially easy handling of the grip width adjustment is made possible.

Such grip shells can also be manufactured inexpensively. Furthermore, this invention produces the advantageous result that a fatigue phenomenon of the user's hand due to a grip width that is not optimally adapted to the hand size is greatly reduced.

BRIEF DESCRIPTION OF THE DRAWINGS

Other objects and advantages of the invention will become apparent from a study of the following specification, when viewed in the light of the accompanying drawing, in which:

FIGS. 7 and 8 are sectional and top plan views of a gripping tool have cam-operated thickness adjusting means for adjusting the effective thickness of one of the hand grip levers.

DETAILED DESCRIPTION OF THE INVENTION

Figure 1:
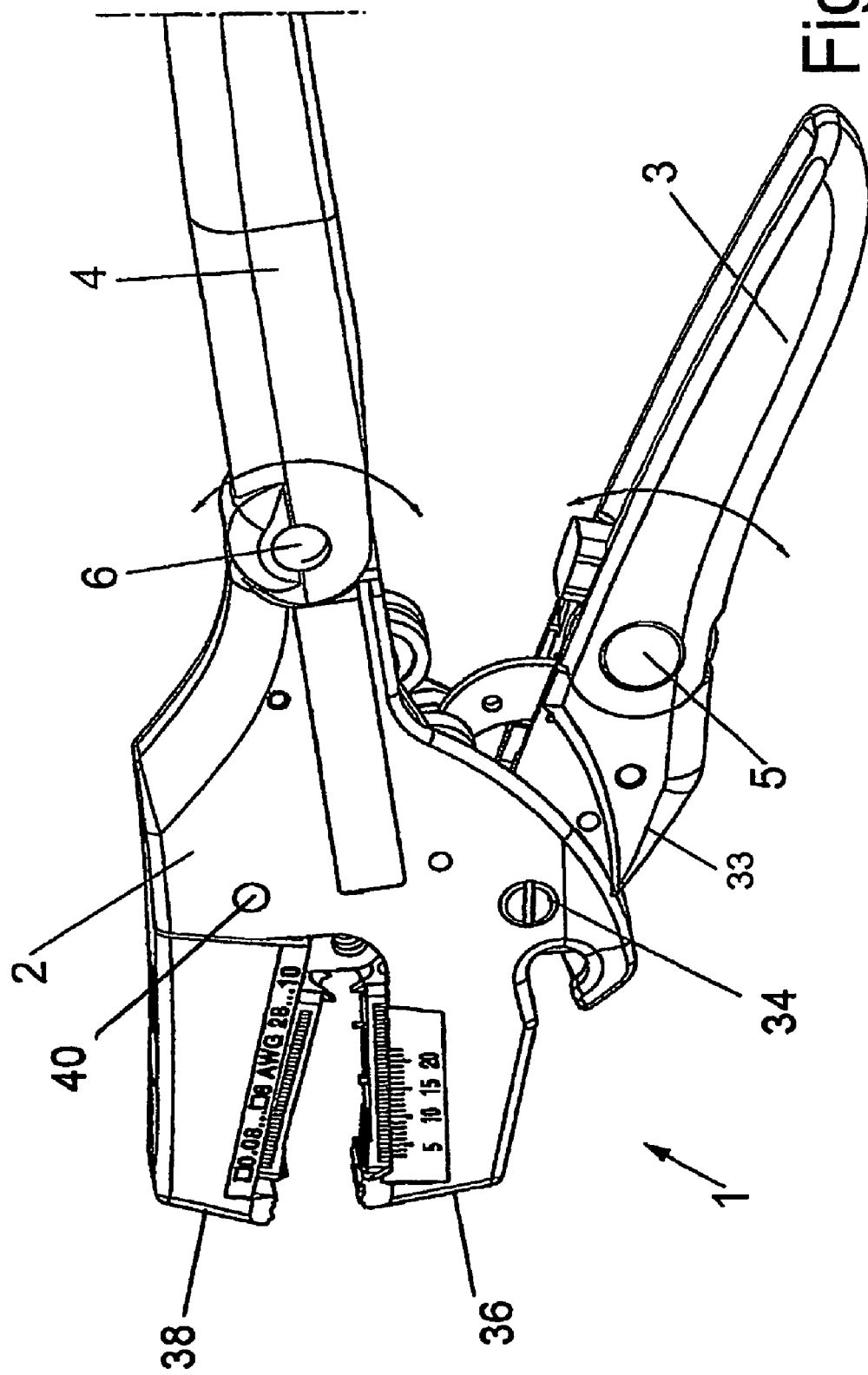
FIG. 1 is a side perspective view of the gripping tool of the present invention when in its normal operating condition.

Referring first more particularly to FIG. 1, the pliers-type gripping tool 1 includes a tool housing 2 carrying a first gripping jaw 36. A companion gripping jaw 38 is pivotally connected with the housing 2 for pivotal movement about pivot axis 40. As is known in the art, the jaw 38 is operable between the illustrated separated open position and a closed gripping position by operating means including lower hand grip means that are pivotally connected with the housing by pivot pin 34. In accordance with the present invention, these lower hand grip means are sectional and include a first lower grip section 3 that is rigidly connected with the second section 33 by adjustable angle setting means 5, which second section is pivotally connected with the housing 2 by pivot pin 34. Similarly, the upper hand grip lever means includes a hand grip section 4 that is rigidly connected with the housing section 2 by adjustable angle setting means 6.

Figure 3:
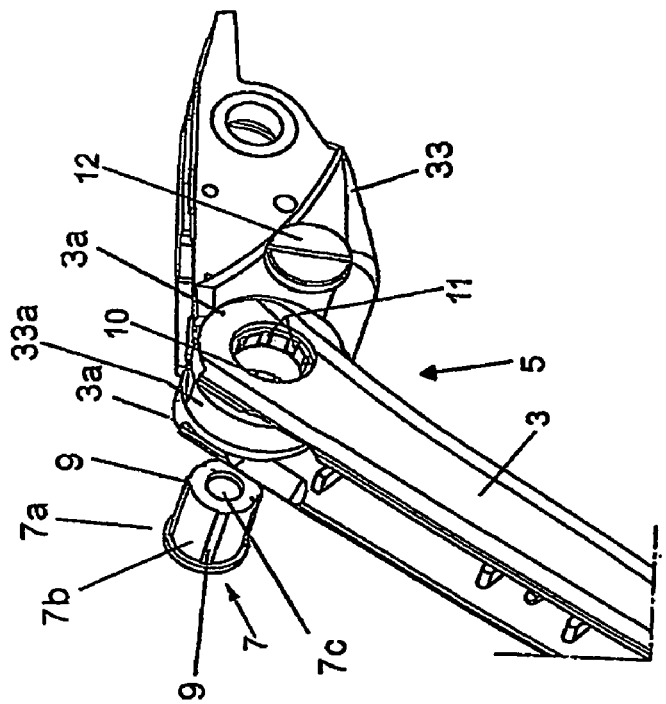
FIG. 3 is a detailed exploded view of the angular adjustment setting means of the gripping tool of FIGS. 1 and 2.
Figure 2:
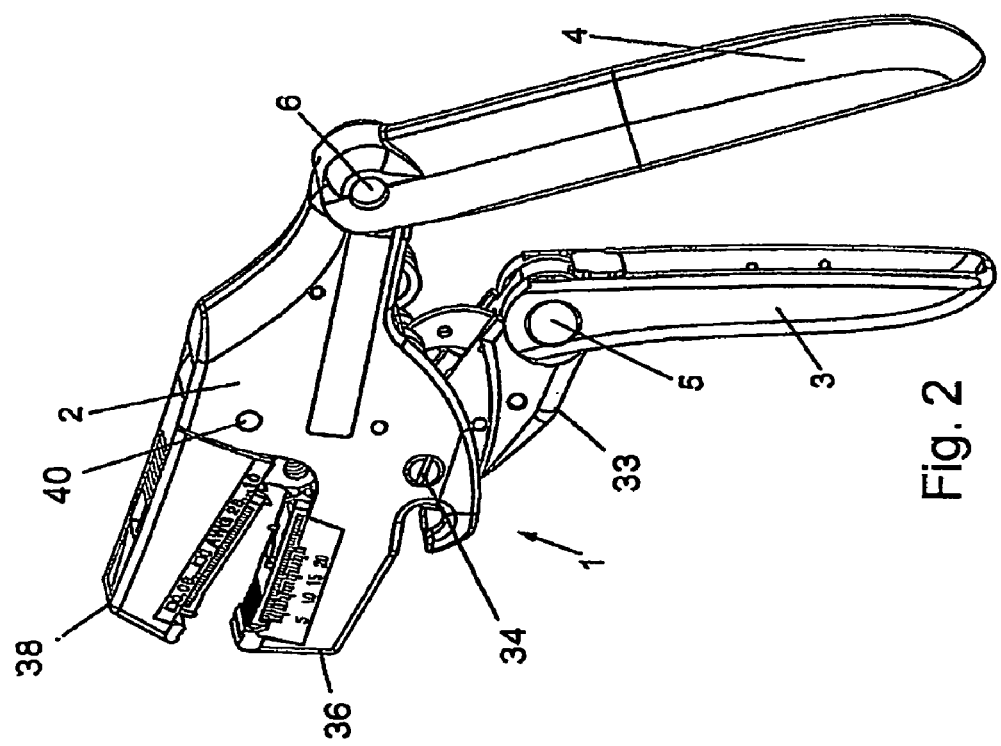
FIG. 2 is a corresponding view with the hand grip levers in angularly adjusted positions.

Referring now to FIGS. 2 and 3, in accordance with the present invention, the angle setting means 5 and 6 are operable to connect the hand grip lever sections 3 and 4 at selected angular relationships to the associated lever sections 33 and 2, respectively, thereby to permit use of the tool to grip an object at a relatively inaccessible location. As shown in FIG. 3, one end of the lever section 3 is bifurcated to define a slot between the parallel end extremities 3a of lever section 3, which slot receives the parallel reduced planar extremity 33a of the lever section 33. The angle setting means 5 includes a cylinder 7 having an annular external flange 7a at one end thereof, and an outer circumferential surface 7b that carries a plurality of circumferentially-spaced, longitudinally-extending integral locking keys 9. At its other end 7c, the cylinder contains a threaded bore 14.

After the sections 3 and 33 have been positioned in a desired angular relationship in accordance with the gripping operation to be performed, the cylinder 7 is inserted within the aligned bores 10 contained in the end extremities 3a and 33a, with the keys 9 extending in locked relation within corresponding locking slots 11 contained on the wall surfaces of the bores 10. The cylinder flange portion 7a is in abutting engagement with the adjacent outer surface of the lever portion 3a, whereupon a locking screw 12 is screwed into the bore 14 so that the head portion of the screw engages the adjacent outer surface of the associated section extremity 3a. The sections 3 and 33 are thus rigidly connected together at the desired angle. Similarly, the locking means of the angle setting means 6 includes corresponding cylinder key and slot angle locking means.

Figure 4:
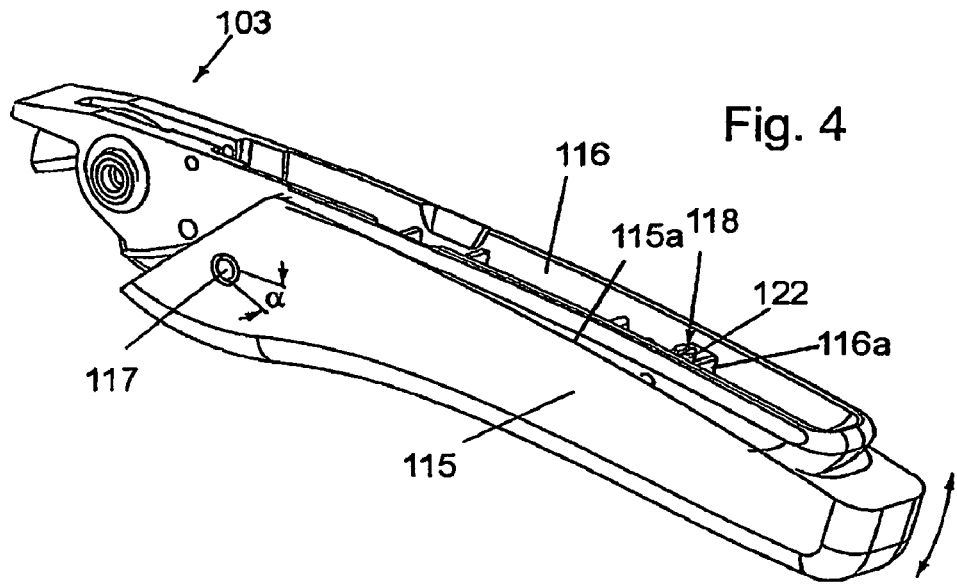
FIG. 4 is a perspective view of a hand grip lever provided with screw-type thickness adjustment means.
Figure 5:
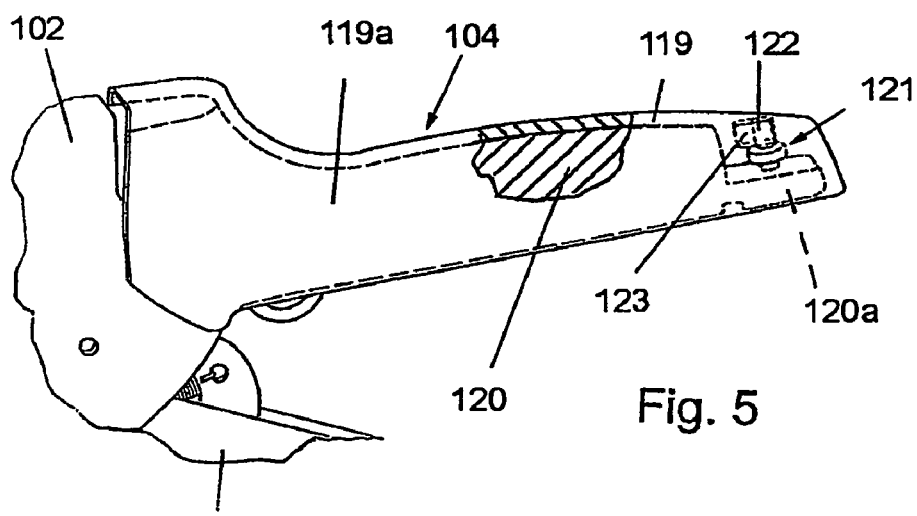
FIGS. 5 and 6 are perspective views of a similar hand grip lever of the screw-type thickness adjustment means when in the contracted and expanded conditions, respectively.
Figure 6:
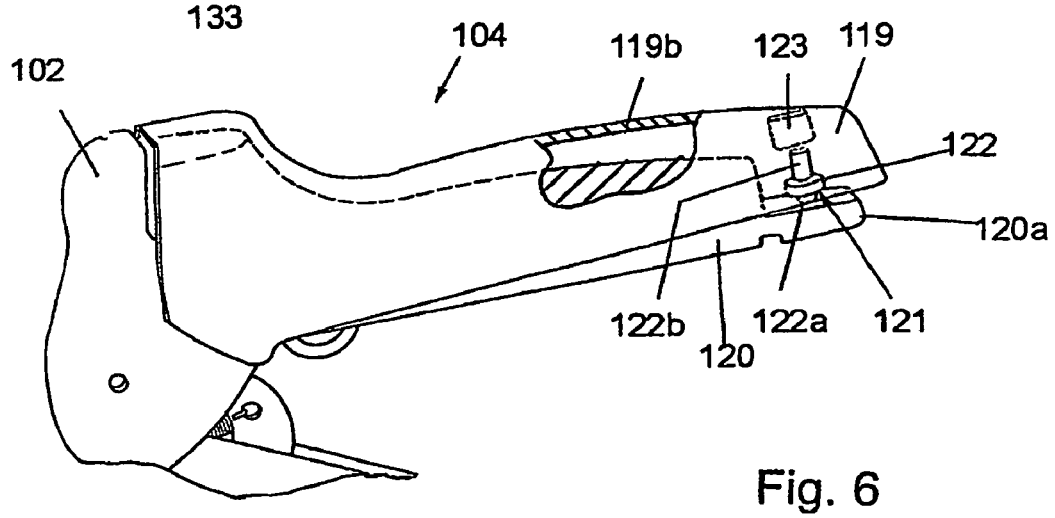

According to another feature of the invention shown in FIGS. 4-6, the effective thickness of the hand grip levers may be adjusted to correspond with the size of the hand of a user of the gripping tool. The hand grip lever 103 of FIG. 4 includes a metal lever body member 116 is partially enclosed by an outer shell member 115 formed from a resilient synthetic plastic material. The shell has a generally U-shaped configuration including a pair of spaced side walls 115a joined by a transverse wall (not shown). At one end, the shell side walls are pivotally connected with the lever body for displacement through the angle a by thickness adjusting means 118 at the other end of the shell. The thickness adjusting means includes a screw 122 that is threadably connecting in a though bore contained in transverse bridge portion 116a of the lever body for engagement at its free extremity with the inside surface of the shell.

In the modification shown in FIGS. 5 and 6, the upper hand grip lever 104 includes a metal lever body 120 that is partially enclosed by a shell 119 formed from a resilient synthetic plastic material. The shell has a generally U-shaped configuration and includes a pair of parallel spaced side walls 119a that are joined by a transverse wall 119b, which side walls are resiliently biased together toward tight frictional engagement with the adjacent outer surfaces of the lever body 120. In this embodiment, the thickness adjusting means 121 includes an adjusting screw 122 having a lower end potion 122a that is threadably connected with a vertical bore contained in the lever end portion 120a, and an upper end portion that extends into a chamber 123 contained in the adjacent end portion of the shell 119. Thus, rotation of the screw 122 relative to the lever body control the spacing distance between the shell transverse wall 119b and the lever body, thereby to control the effective thickness of the handgrip.

Referring now to the preferred embodiment of FIGS. 7 and 8, the shell 219 of the upper hand grip lever 204 has a U-shaped cross-sectional configuration and includes a pair of side walls 219a, and a transverse wall 219b. The side walls of the synthetic plastic shell are resiliently biased together toward tight frictional engagement with the adjacent surfaces of the metal lever body 220. The thickness adjustment means of this embodiment comprises a plurality of longitudinally-spaced integral saw-tooth shaped projections 225 carried by the inner surface of the shell transverse wall 219b, which projections extend downwardly into corresponding grooves 226 having similar generally sawtooth-shaped longitudinal cross-sectional configurations. When the shell 219 is longitudinally displaced to the right relative to the lever body 220, the inclined mating cam surfaces 227 of the shell and lever body members cause the shell to be displaced laterally outwardly, thereby to increase the thickness dimension b, as desired. Locking means such as the locking screw 250 may be provided for locking the shell at a desired position relative to the lever body.

Alternatively, the longitudinally directed locking tab 219c may be provided that extends within a correspond one of several longitudinally spaced recesses.

Figure 9:
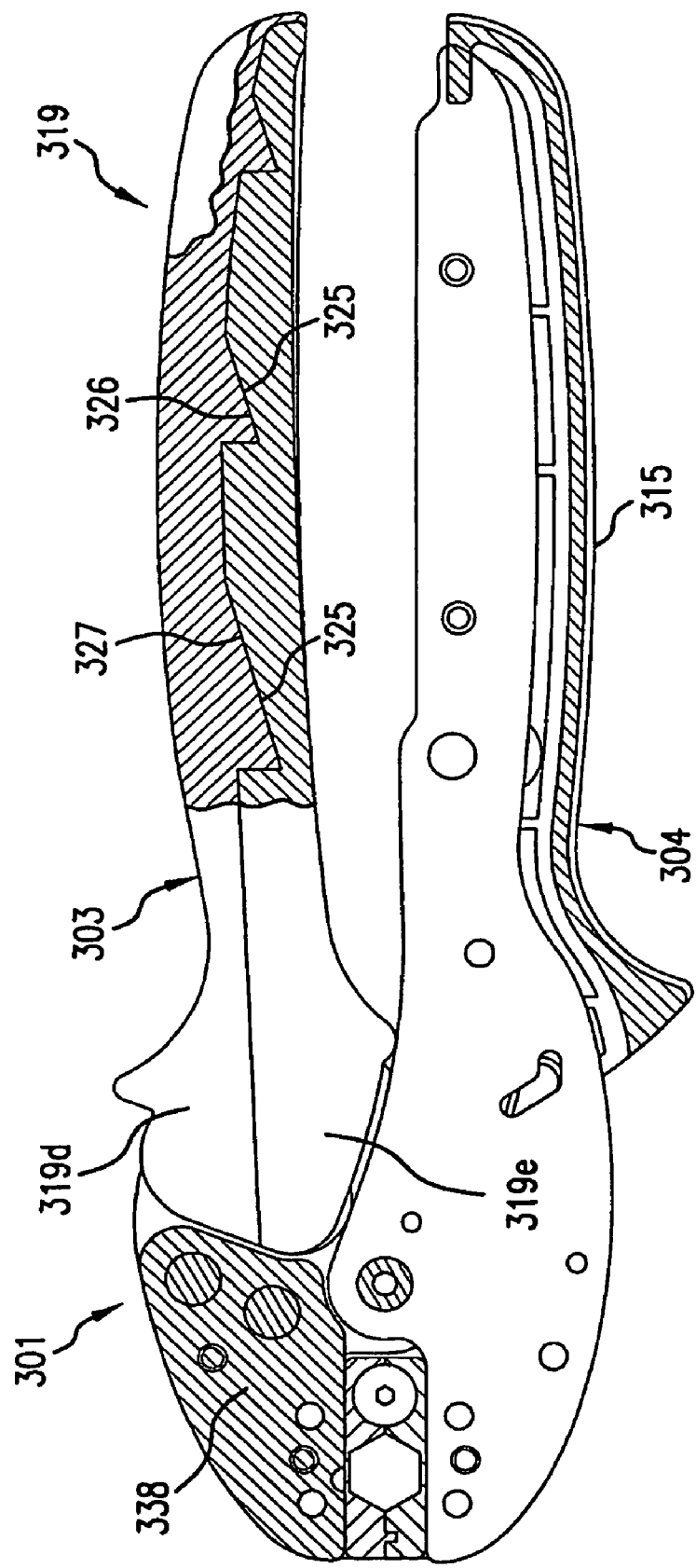
FIG. 9 is a side elevation view of a modified hand grip lever arrangement including the cam-type thickness adjustment means of FIG. 7.

In the modification of FIG. 9, the synthetic plastic shell 319 having a U-shaped cross-sectional configuration is sectional and includes lower side wall sections 319e that are fastened the adjacent outer surfaces of the metal lever body that is partially enclosed by the shell. The upper U-shaped section 319d has edge portions provided with sawtooth-shaped projections 325 extending in corresponding grooves 326 contained in the upper edges of the lower shell section 319e. When the shell section 319d is longitudinally displaced to the right relative to the lower shell sections 319e that are fastened to opposite sides of the lever body, the inclined cam surfaces 327 cause the upper shell section 319 to be displaced outwardly, thereby to increase the effective thickness of the handle.

Although the thickness determining projections have been illustrated as being of a generally sawtooth shape, it is apparent that other cam shape configurations may be provided, such as a tear-shaped configuration. Furthermore, the locations of the projections and grooves on the shell sections could be reversed, if desired.

While in accordance with the provisions of the Patent Statutes the preferred forms and embodiments of the invention have been illustrated and described, it will be apparent to those skilled in the art that changes may be made without deviating from the invention described above.

What is claimed is:

1. A pliers-type gripping tool for stripping insulation from conductors, and the like, comprising:
   (a) a pair of gripping jaws (36, 38; 136, 138; 236, 238) connected for relative displacement between an open separated condition and a closed gripping condition;
   (b) operating means for operating said gripping jaws between said open and closed conditions, said operating means including a pair of pivotally connected hand grip levers (3,4; 103, 104; 203, 204) connected with said gripping jaws, respectively; and
   c) adjustment means (5,6; 18, 21; 219b, 226) for varying the effective thickness of at least one of said hand grip levers, thereby to vary the hand grip size of the tool to correspond with the size of the user's hand.

2. A pliers-type gripping tool as defined in claim 1, wherein said hand grip lever includes:

(1) a lever body member (116; 120; 216) formed of metal;
(2) an external shell member (115; 119; 219) formed of synthetic plastic material, said shell member having a generally U-shaped cross-sectional configuration, thereby to define a pair of side walls (115a; 119a; 219a); joined by a transverse wall (115b; 116b; 219b), said shell member being mounted to partially enclose and extend longitudinally about said lever body with said shell side walls being adjacent opposite sides of said lever body member, respectively, said shell member being mounted for lateral displacement relative to said lever body; and
(3) thickness adjustment means (18; 21; 225, 226) for varying the lateral position of said shell member relative to said lever body member, thereby to adjust the effective thickness of said hand grip lever.

3. A pliers-type gripping tool as defined in claim 2, wherein said thickness adjustment means includes an adjustment screw (22) threadably connected at one end with a threaded bore contained in one of said lever body and shell members, said adjustment screw extending at its other end within an adjustment chamber (23) contained in the other of said lever body and shell members.

4. A pliers-type gripping tool as defined in claim 3, wherein said shell member side walls are resiliently biased inwardly toward engagement with opposite sides of said lever body member.

5. A pliers-type gripping tool as defined in claim 3, and further including pivot means (17) pivotally connecting said shell side walls with said lever body at one end of said shell member adjacent said clamping jaws; said adjustment screw means (18) being arranged between the other end of said shell member and said lever body.

6. A pliers-type gripping tool as defined in claim 2, wherein said thickness adjustment means comprises cam means (225, 226) operable when said members are longitudinally displaced relative to each other to vary the lateral relative positions of said lever bore and shell members, thereby to produce a desired effective thickness dimension b of the hand grip lever.

7. A pliers-type gripping tool as defined in claim 6, wherein said cam means includes at least one longitudinally-extending generally sawtooth-shaped projection (225) carried by the inner surface of said shell transverse wall (219b), said projection extending within a corresponding groove (226) contained in the adjacent outer surface of the associated lever body member, said projection and said groove having corresponding inclined ramp surfaces (227) for laterally displacing said shell member relative to said lever body member during relative longitudinal displacement of said members.

8. A pliers-type gripping tool as defined in claim 7, wherein said shell member side walls (219a) are resiliently biased inwardly toward engagement with opposite sides of said lever body member.

9. A pliers-type gripping tool as defined in claim 7, and further including fastening means (250) for fastening said shell member to the associated lever body member.

10. A pliers-type gripping tool as defined in claim 6, wherein said shell member (319) is sectional and includes a first shell section (319e) fastened to said lever body member, and a second shell section (319d) mounted for longitudinal displacement relative to said first section; and further wherein said cam means includes at least one projection (325) on one of said shell sections extending into a corresponding groove (326) contained in the other of said shell sections, said groove and said ramp having corresponding angularly-arranged ramp surfaces (327).

11. A pliers-type gripping tool for stripping insulation from conductors, and the like, comprising:
(a) a pair of gripping jaws (36, 38; 136, 138; 236, 238) connected for relative displacement between an open separated condition and a closed gripping condition;
(b) operating means for operating said gripping jaws between said open and closed conditions, said operating means including a pair of pivotally connected hand grip levers (3,4; 103, 104; 203, 204) connected with said gripping jaws, respectively; and
(c) adjustment means (5,6; 18, 21; 219b, 226) for varying the angular orientation of at least one of said hand grip levers relative to its associated gripping jaw, thereby to permit use of the tool to grip an object at a relatively inaccessible location, wherein:
(1) at least one of said hand grip levers comprises a pair of lever sections (2,4; 3, 33) arranged in generally end-to-end relation, one of said hand grip lever sections having a first end extremity that is bifurcated to define a slot extending between two parallel first end walls (3a);
(2) wherein the associated hand grip lever section has at its end extremity a planar second end wall (33a) extending in parallel relation into said slot;
(3) and further including angle setting means (5, 6) for connecting together said hand grip lever sections at a given angle, said angle setting means comprising:
  (a) a cylinder (7) removably extending through aligned bores (10) contained in said first and second section end walls, said cylinder having an outer circumferential surface (7a) provided with a plurality of longitudinally extending keys (7b) that extend within corresponding slots (11) contained in said first and second section end walls, thereby to lock said sections against angular displacement; and
  (b) retaining means (7c, 12) for retaining said cylinder in said bores.

12. A pliers-type gripping tool as defined in claim 11, wherein said retaining means comprises:
(a) a circular integral flange portion (7b) extending radially outwardly from one end of aid cylinder; and
(b) a locking screw (12) threadably connected with a threaded bore contained in the other end of said cylinder, said locking screw having a head portion arranged for engagement with the outer surface of the adjacent section end wall.

13. A pliers-type gripping tool as defined in claim 11, wherein each of said hand grip levers is sectional, the sections of each hand grip lever being connected by corresponding angle setting means.

* * * * *